Dec. 5, 1933.  F. SMITH  1,937,919
RECORDED ACCOMPANIMENT FOR MUSICAL COMPOSITIONS
Filed Jan. 21, 1931  3 Sheets-Sheet 1

INVENTOR
Franklyn Smith
BY
ATTORNEYS

Dec. 5, 1933.  F. SMITH  1,937,919
RECORDED ACCOMPANIMENT FOR MUSICAL COMPOSITIONS
Filed Jan. 21, 1931  3 Sheets-Sheet 2

INVENTOR
Franklyn Smith
BY
Pennie, Davis, Marvin, Edmonds
ATTORNEYS

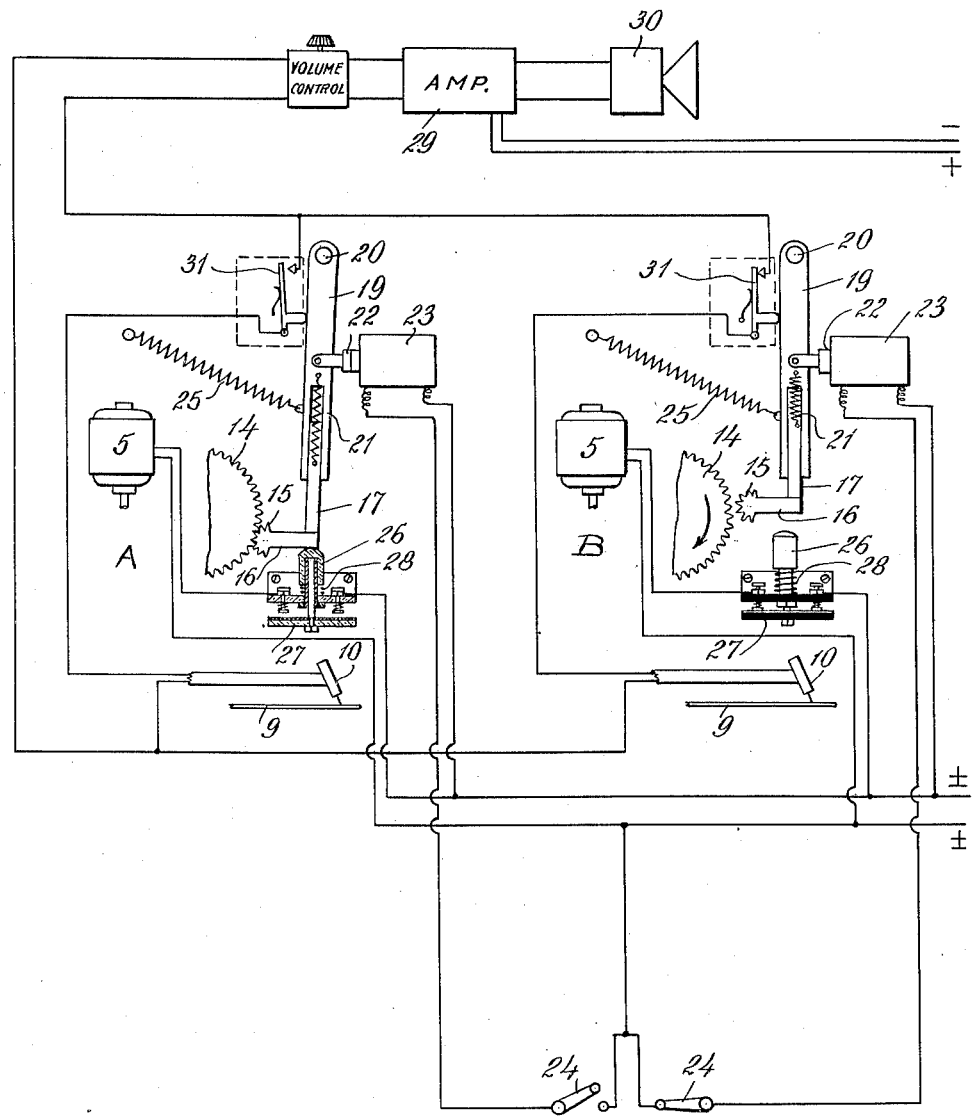

Patented Dec. 5, 1933

1,937,919

UNITED STATES PATENT OFFICE 1,937,919

RECORDED ACCOMPANIMENT FOR MUSICAL COMPOSITIONS

Franklyn Smith, New York, N. Y.

Application January 21, 1931. Serial No. 510,221

8 Claims. (Cl. 274—1)

This invention relates to recorded accompaniments for musical compositions having one or more unaccompanied solo parts, and has for its objects the provision of a novel recorded accompaniment for such a composition, and the provision of novel methods of and apparatus for recording and reproducing the recorded accompaniment.

A musical composition written for a solo instrument (piano, violin, cello, flute, etc.) with an accompaniment by an orchestra of symphonic size is commonly termed a concerto. Practically every composer whose works have lived contributed one or more concerti. The advanced student of any solo instrument learns, as a part of his musical education, one or more of these concerti. In many cases, the orchestral accompaniment has been arranged so that it may be played on the piano, and a student or musician, after learning the concerto, depends upon such a piano arrangement, played by an accompanist, to give him a slight idea of the spirit and proper interpretation of the composition. Obviously, this is, at best, a very poor make-shift and entirely inadequate for public performance. Students and musicians who reach the concerto stage are legion. Symphony orchestras are few and fully occupied with preparations for public performances. Therefore, the student or musician's opportunity to ever play a concerto properly accompanied by an orchestra is practically negligible.

Recognizing the importance attached to this type of music by the musical pedagogue and the favorable reaction and appreciation of the public to its performance, it is my aim in the present invention to provide, by sound recording and reproducing means, appropriate recorded accompaniments for concerti. The provision of such a recorded accompaniment would be comparatively simple if the soloist and orchestra were playing together at all times. However, at various places throughout the composition, the orchestra is silent and the soloist plays alone. These unaccompanied solo passages are from a few seconds to several minutes in duration. They allow latitude for individual interpretation, and on this account the same solo passage is rarely rendered, even by the same artist, in precisely the same time interval. It is, therefore, essential that the recorded accompaniment permit such latitude of individual interpretation of solo passages, while at all other times synchronously accompanying the performer.

The recorded accompaniment of my present invention meets the foregoing requirements. The recording and reproduction may be effected with any appropriate types of sound recording and reproducing devices. The record itself consists of accompaniment parts alternating with blank spaces of uniform length, the position of the blank spaces in the record corresponding to the unaccompanied solo parts of the composition. In recording the accompaniment, a definite time interval of a few seconds duration is permitted to elapse between the conclusion and resumption of consecutive accompaniment parts, quite irrespective of the actual length of the intervening solo part. In reproducing the recorded accompaniment, the student or artist performer so controls the interruption and reestablishment of the operative relative movement between the sound reproducing device and the record that the length of each of the blank spaces in the record corresponds to the actual relative movement of the sound reproducing device and the record during the execution of the corresponding unaccompanied solo part.

In carrying out the invention, first to produce the recorded accompaniment, the accompanied parts of the musical composition and the accompaniment therefor are simultaneously rendered by a soloist and an orchestra. The accompaniment (but not the musical composition) is recorded on an appropriate record, blank spaces of uniform length being provided in the record between the conclusion and resumption of accompaniment parts preceding and following respectively an unaccompanied solo part of the musical composition. Preferably, the musical composition and its accompaniment are performed for recording under such conditions that the accompaniment is audible to the performer of the musical composition while the musical composition is inaudible to the performers of the accompaniment but audible to the conductor of the latter. The blank spaces are advantageously provided by omitting the performance of the unaccompanied solo parts and substituting therefor a definite time interval of a few seconds duration between the last and first notes respectively of the accompaniment parts preceding and following the unaccompanied solo part of the composition.

The record of the accompaniment thus obtained is available in conjunction with an appropriately controlled sound reproducing device for accompanying a performance of the musical composition. To this end the sound reproducing device is provided with suitable actuating means for establishing and for interrupting the operative relative movement between the device and the record of the accompaniment, and is additionally provided with suitable means whereby the length of each of the blank spaces of the record corresponds to the actual relative movement of the device and the record between the conclusion and resumption of consecutive accompaniment parts when the actuating means is operated (preferably by the soloist) at predetermined times with respect to the conclusion and resumption of consecutive accompaniment parts.

The practical application of the foregoing features of the invention will be best understood from the following description taken in conjunction with the accompanying drawings, in which Fig. 1 is a diagrammatic elevation partly in section of a duplex sound reproducing apparatus adapted for accompanying a musical composition with the novel recorded accompaniment of the invention;

Fig. 3 is a diagram of the electrical circuits of the complete apparatus, and

I will first describe my preferred practice in making a record of the accompaniment with the characteristic blank spaces of uniform length properly positioned to correspond to the unaccompanied solo passages of the composition. A soloist, for performing the musical composition, and an orchestra, for performing the accompaniment, are assembled. The soloist is so placed with respect to the orchestra that the performance of each is directly inaudible to the other. A microphone is positioned in proximity to the soloist and is operatively connected to a headphone worn by the conductor of the orchestra. The conductor is thus able to hear the soloist and accompany him faithfully. The recording line is tapped and operatively connected to a small speaker set up near the soloist so that he hears the orchestra as it plays the accompaniment. By this arrangement, the conductor hears the soloist and the soloist hears the orchestral accompaniment, while at the same time the soloist is outside of the recording microphone range and his performance will not be registered on the resulting recorded accompaniment.

Figure 1:
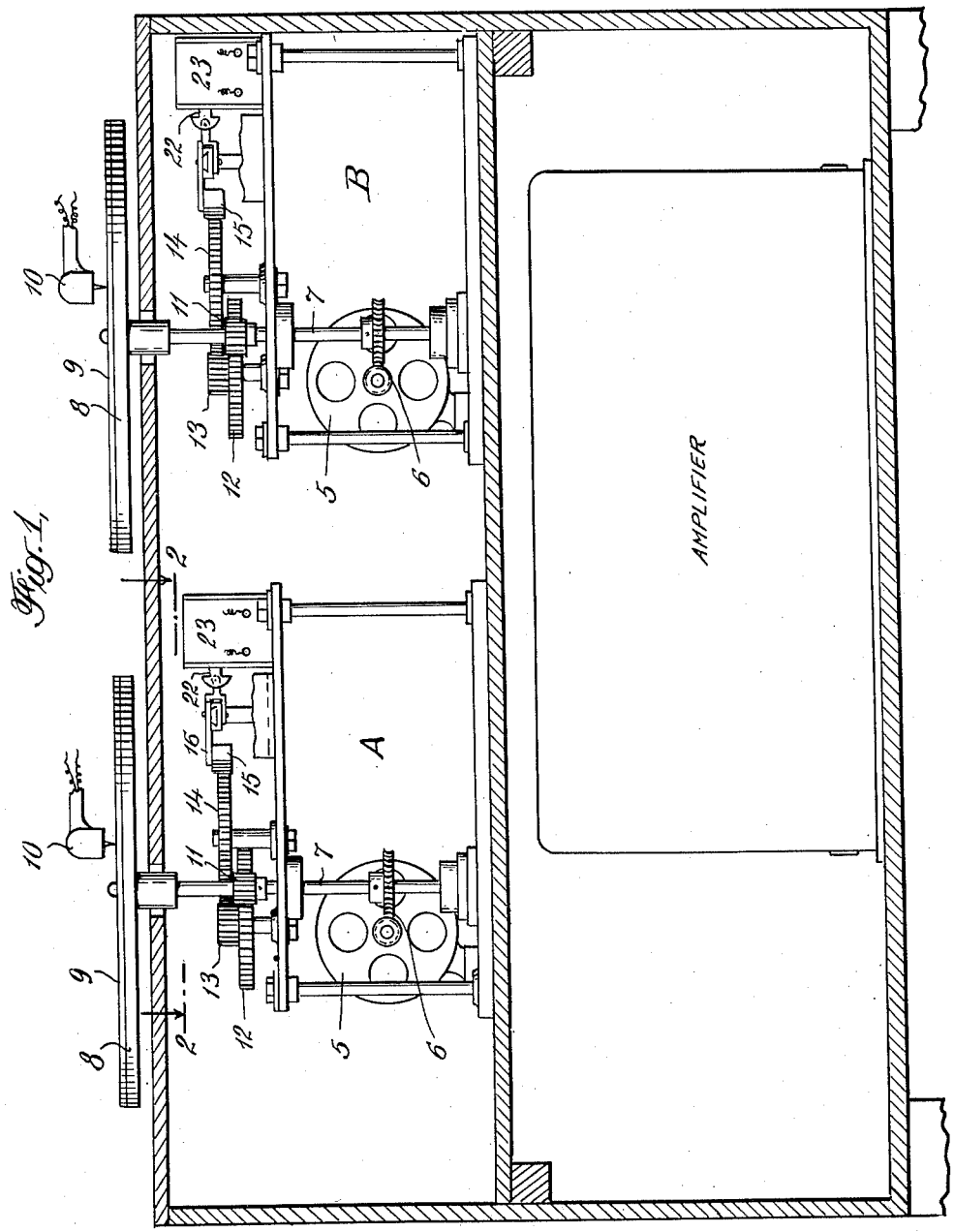
Figure 2:
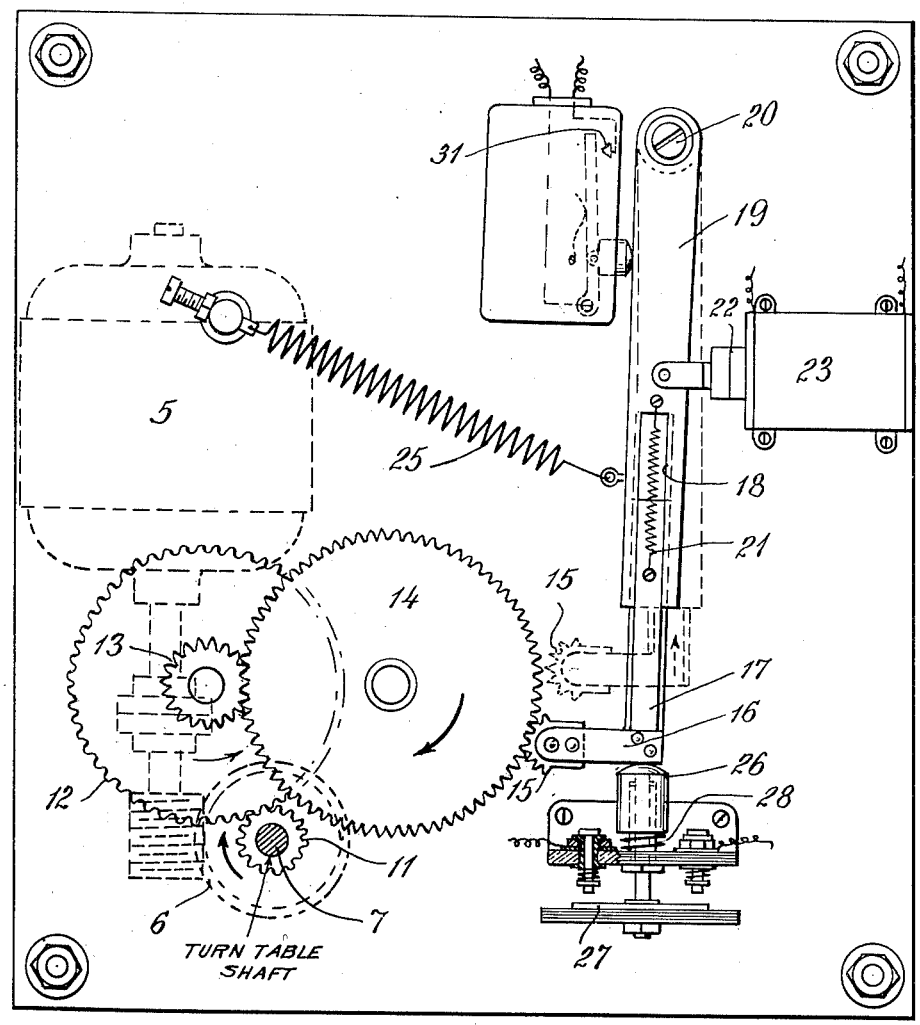
Fig. 2 is a sectional top plan taken on the section line 2—2 of Fig. 1.
Figure 4:
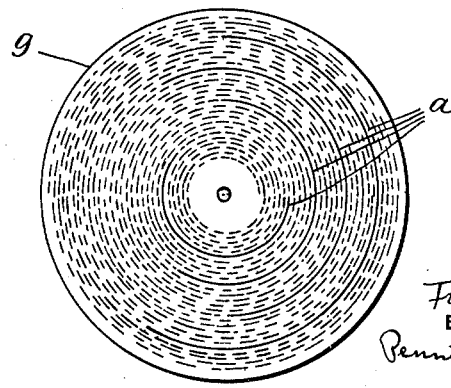
Fig. 4 is a plan view of a record embodying the invention in which the characteristic blank spaces of uniform length are indicated by $a$.

When a solo passage in the musical composition is reached, the soloist omits it. The conductor, by a stop watch, permits the elapse of a predetermined definite time interval, say four seconds, between the last note played by the orchestra (preceding the solo passage) and the playing of the first note of the succeeding orchestral accompaniment. Wherever a solo passage occurs in the composition, irrespective of its length, the conductor permits the elapse of this same definite time interval between consecutive orchestral accompaniments. The resulting finished record is therefore a complete accompaniment for the musical composition with blank spaces (wherever a solo passage occurs) of a length equal to the relative movement of the recording device and the record during the equal predetermined time intervals marked off by the conductor. Such a record and duplicates thereof (made in the well understood manner) are available for any student or artist for practice or public performance, provided the record is used in conjunction with the sound reproducing apparatus adapted for appropriate control of the blank spaces in the record. A suitable apparatus for the purpose is illustrated in Figs. 1, 2 and 3 of the drawings.

The apparatus shown in the drawings comprises two identical sound reproducing units A and B. Such a duplex form of apparatus permits the performance of accompaniments of twice the length possible with a single unit apparatus. Using a disk record 16 inches in diameter having an operative speed of 33 R. P. M. provides about 14 minutes of recorded accompaniment. This is inadequate for the average concerto, and hence necessitates the duplex form of apparatus. By the use of a larger record, a single unit apparatus becomes practicable.

Each of the units A and B embodies an electric motor 5 designed to operate at a constant speed, such for example as a synchronous motor. The shaft of the motor is operatively connected by worm-gearing 6 to a vertically disposed rotatably mounted shaft 7 having a turn-table 8 secured thereto. A record 9 embodying the invention is carried on the turn-table in operative relation with the stylus 10 of the sound reproducing device.

The shaft 7 has a pinion 11 secured thereto intermediate the gearing 6 and the turn-table 8. The pinion 11 meshes with a gear 12 secured to the same shaft as a pinion 13. A gear 14 meshes with the pinion 13.

A gear-toothed element 15 is mounted for movement into and out of mesh with the gear 14. To this end, the element 15 is secured to a bracket 16 attached to one end of a longitudinally movable arm 17. The arm 17 is mounted for longitudinal movement in a recess 18 in one end of a lever arm 19 pivoted at its other end 20. A spring 21 biases the arm 17 to its innermost position within the recess 18.

The lever arm 19 is operatively connected to the movable armature 22 of an electro-magnetic solenoid 23. A control switch 24 is included in the circuit of the solenoid winding and a suitable source of electric energy. The switches 24 (one for each unit A and B) are positioned in proximity to the performer of the musical composition. The switches may advantageously be arranged for actuation by the foot of the performer, in a manner similar to the manipulation of the pedals of a piano. For the sake of simplicity, the switches 24 are indicated in the drawings as of the simple "on-off" type, but in practice are preferably of the single button, two-station type.

When the solenoid 23 is energized, its armature 22 pulls the lever arm 19, and hence toothed element 15, to its right-hand position against the tension of a spring 25. The sound reproducing apparatus now operates to play the recorded accompaniment. When the switch 24 is next actuated (opened), the solenoid 23 is de-energized and the spring 25 pulls the lever arm 19 to the left until the toothed element 15 meshes with the gear 14. Rotation of the gear 14 carries the element 15 and its attached arm 17 outwardly (with respect to the recess 18) against the tension of the spring 21. When the arm 17 has thus travelled a predetermined distance, it engages the button 26 of a switch element 27 in the circuit of the motor 5. A spring 28 normally biases the switch 27 to its circuit-closing position. The engagement of the arm 17 with the button 26 opens the switch 27, thereby stopping the motive means driving the turn-table 8. The spring 28 possesses sufficient resilient force to absorb the momentum of the rotating mechanism when the energy supply of the motor 5 is interrupted, and the gear 14 and other rotating parts of the mechanism are brought to rest after travelling a predetermined distance following the actuation of the switch 24.

The stylus 10 of each sound reproducing unit is electrically connected, in the manner well understood in the art, to an amplifier 29 and a loud speaker 30. A switch 31 is included in this electric circuit. The switch 31 is normally biased to its circuit-closing position, and is moved to its open position by the lever arm 19 when the solenoid 23 is de-energized. This insures complete silence of the loud-speaker 30 during the performance of solo passages.

The operation of the apparatus is reasonably evident from the foregoing description. With one of the switches 24 closed, the sound reproducing apparatus synchronously accompanies the accompanied passages of the musical composition. At a predetermined time with respect to the commencement of a solo passage, say when the last note of the accompaniment is played, the soloist actuates the switch 24 to its open position. The record moves a predetermined distance until brought to a full stop by the action of the toothed element 15 and its cooperating gear 14. A predetermined definite amount of the blank space of the record (corresponding to this solo passage) is thereby run over. The soloist plays the solo passage according to his own interpretation thereof. At a predetermined time interval in advance of the instant he desires the accompaniment to be resumed, he again actuates the switch 24, this time to its circuit closing position. The sound reproducing mechanism is thereby set in operation and attains its full normal speed before the remainder of the blank space is run over, and the recorded accompaniment begins to play at the instant desired by the soloist. The length of each of the blank spaces in the record thus corresponds to the actual relative movement of the stylus 10 and the record 9 between the conclusion and resumption of consecutive accompaniment parts when the soloist operates the actuating switch 24 at predetermined times with respect to the conclusion and resumption of such consecutive accompaniment parts.

Where I have herein spoken of the blank spaces in the record as being of uniform length, it will be understood that I mean equal in operative length. The linear length of the blank spaces is not necessarily the same, since in a disk record the linear length of the blank spaces will be slightly greater the nearer the blank spaces are to the periphery of the record. The uniformity in length of the blank spaces is with respect to the operative time that it takes the apparatus to run over the spaces.

When the end of the record on the unit A has been reached, the soloist actuates the switch 24 of this unit to its open position, and actuates the switch 24 of the unit B to its circuit closing position. The pick-ups of the two units A and B are initially placed at the appropriate starting mark on each. The soloist is thus able to complete his performance of the composition without any interruption to change records.

While the invention has been particularly described with respect to providing orchestral accompaniment for concerti, its applicability extends far beyond this particular field. Thus, the invention may be used with advantage in providing recorded accompaniments for operas, oratorias, choruses, and the like. The invention may be used with advantage by students for practice purposes and by musicians for public performances including radio broadcasting.

I claim:

1. A sound reproducing apparatus including a record carrier and a cooperating sound reproducing device, motive means for effecting operative relative movement between said carrier and said device, a movable member operatively connected to said motive means, a second movable member having two operative positions in one of which it engages and moves with said first member and in the other of which it is disengaged from said first member, means for moving said second member into each of its said operating positions, and means cooperating with said second member for controlling the energization of said motive means and for absorbing the momentum of the moving parts of said apparatus when said motive means is de-energized.

2. A sound reproducing apparatus including a record carrier and a cooperating sound reproducing device, an electric motor for effecting operative relative movement between said carrier and said device, a movable member operatively connected to said motor, a second movable member having two operative positions in one of which it engages and moves with said first member and in the other of which it is disengaged from said first member, means for moving said second member into each of its said operating positions, means in the path of movement of said second member when moving with said first member for controlling the supply of electric energy to said motor, and means for absorbing the momentum of the moving parts of said apparatus when the supply of electric energy to said motor is interrupted.

3. A sound reproducing apparatus comprising a movable record carrier, an electric motor operatively connected to said carrier, a rotatable member operatively connected to said motor, a movable element having two operative positions in one of which it engages and moves with said member and in the other of which it is disengaged from said member, means for moving said element into each of its said operating positions, means in the path of movement of said element when moving with said member for controlling the supply of electric energy to said motor, and means for absorbing the momentum of the moving parts of said apparatus when the supply of electric energy to said motor is interrupted.

4. A sound reproducing apparatus including a record carrier and a cooperating sound reproducing device, an electric motor for effecting operative relative movement between said carrier and said device, a movable member operatively connected to said motor, a second movable member having two operative positions in one of which it engages and moves with said first member and in the other of which it is disengaged from said first member, means for moving said second member into each of its said operating positions, circuit-controlling means for said electric motor positioned in the path of movement of said second member when moving with said first member, and means cooperating with said second member when moving with said first member for absorbing the momentum of the moving parts of said apparatus when said circuit-controlling means is actuated to interrupt the supply of electric energy to said motor.

5. A sound reproducing apparatus including a record carrier and a cooperating sound reproducing device, an electric motor for effecting operative relative movement between said carrier and said device, a speed reducing gear train operatively connected to said motor, a movable member adapted in one position to engage the final gear of said train and to move therewith and in another position to be disengaged from said final gear, means for moving said member into each of its said positions, means in the path of movement of said member when moving with said final gear for controlling the supply of electric energy to said motor, and means cooperating with said member when moving with said final gear for absorbing the momentum of the moving parts of said apparatus when the supply of electric energy to said motor is interrupted.

6. An apparatus for accompanying a musical composition having one or more unaccompanied solo passages, which comprises a sound reproducing device and a cooperating record made up of alternating accompaniment parts and blank spaces of uniform length whose positions in the record correspond to the unaccompanied solo passages of the musical composition, actuating means for establishing and for interrupting the operative relative movement between said device and said record, and means for effecting coincidence of the length of each of said blank spaces with the actual relative movement of the device and the record between the conclusion and resumption of consecutive accompaniment parts when said actuating means is operated at predetermined times with respect to the conclusion and resumption of said consecutive accompaniment parts.

7. An apparatus for accompanying a musical composition having one or more unaccompanied solo passages, which comprises a sound reproducing device and a cooperating record made up of alternating accompaniment parts and blank spaces of uniform length whose positions in the record correspond to the unaccompanied solo passages of the musical composition, motive means for effecting operative relative movement between said device and said record, actuating means for starting and stopping said motive means, and means for effecting an operative relative movement of said device and said record following the operation of said actuating means to stop said motive means of only a part of the length of a blank space in the record and for causing the operative relative movement of said device and said record to attain its normal velocity after the operation of said actuating means to start said motive means within the remaining part of the length of a blank space in the record.

8. An apparatus for accompanying a musical composition having one or more unaccompanied solo passages, which comprises a sound reproducing device and a cooperating record made up of alternating accompaniment parts and blank spaces of uniform length whose positions in the record correspond to the unaccompanied solo passages of the musical composition, motive means for effecting operative relative movement between said device and said record, actuating means for starting and stopping said motive means, and means for effecting coincidence of the length of each blank space in said record with the actual movement of the record with respect to said device between the operation of said actuating means to stop said motive means and the subsequent attainment of the normal velocity of operative relative movement of the record and the device following the subsequent operation of said actuating means to start said motive means.

FRANKLYN SMITH.